United States Patent
Porte et al.

(10) Patent No.: US 8,684,301 B2
(45) Date of Patent: Apr. 1, 2014

(54) WAVE ATTENUATION PANEL INSERTED BETWEEN THE MOTOR AND AIR INLET OF AN AIRCRAFT NACELLE

(75) Inventors: Alain Porte, Colomiers (FR); Jacques Lalane, Saint Orens de Gameville (FR)

(73) Assignee: Airbus Operations S.A.S., Toulouse (FR)

( * ) Notice: Subject to any disclaimer, the term of this patent is extended or adjusted under 35 U.S.C. 154(b) by 447 days.

(21) Appl. No.: 12/990,562

(22) PCT Filed: Apr. 28, 2009

(86) PCT No.: PCT/FR2009/050781
§ 371 (c)(1), (2), (4) Date: Feb. 10, 2011

(87) PCT Pub. No.: WO2009/138685
PCT Pub. Date: Nov. 19, 2009

(65) Prior Publication Data
US 2011/0139940 A1    Jun. 16, 2011

(30) Foreign Application Priority Data

Apr. 30, 2008   (FR) ...................................... 08 52945

(51) Int. Cl.
*B64D 33/02* (2006.01)

(52) U.S. Cl.
USPC ........................................ 244/53 B; 181/214

(58) Field of Classification Search
USPC .... 244/53 B, 53 R, 54, 1 N; 181/214; 60/725
See application file for complete search history.

(56) References Cited

U.S. PATENT DOCUMENTS

| 4,122,672 A | 10/1978 | Lowrie |
| 6,123,170 A * | 9/2000 | Porte et al. ................. 181/214 |
| 6,237,304 B1 * | 5/2001 | Wycech ........................ 52/847 |
| 7,198,691 B2 * | 4/2007 | Ludin et al. ................. 156/293 |

FOREIGN PATENT DOCUMENTS

| EP | 0898063 A1 | 2/1999 |
| FR | 2347539 A1 | 11/1977 |

OTHER PUBLICATIONS

International Search Report, dated Nov. 25, 2009, from corresponding PCT application.

* cited by examiner

*Primary Examiner* — Timothy D Collins
*Assistant Examiner* — Brian M O'Hara
(74) *Attorney, Agent, or Firm* — Young & Thompson

(57) ABSTRACT

An aircraft nacelle includes a wave attenuation panel which limits or prevents the propagation of at least one wave produced during the pumping of the power plant and includes a layer that is in contact with the air flow that can allow passage of the at least one wave, at least one alveolar structure, and a reflective or impermeable layer, wherein the wave attenuation panel is inserted between the air intake and the power plant, and the layer that is in contact with the air flow ensures the continuity of the aerodynamic surfaces that are arranged downstream and upstream and the wave attenuation panel includes inserts that can be inserted between the air intake and the power plant so as not to crush the wave attenuation panel.

18 Claims, 3 Drawing Sheets

Figure 4:
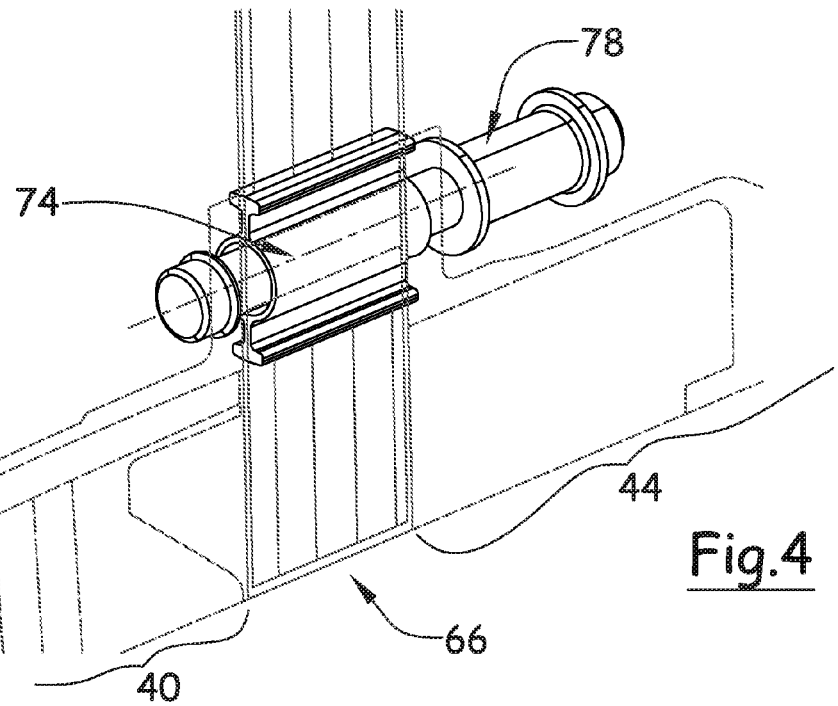

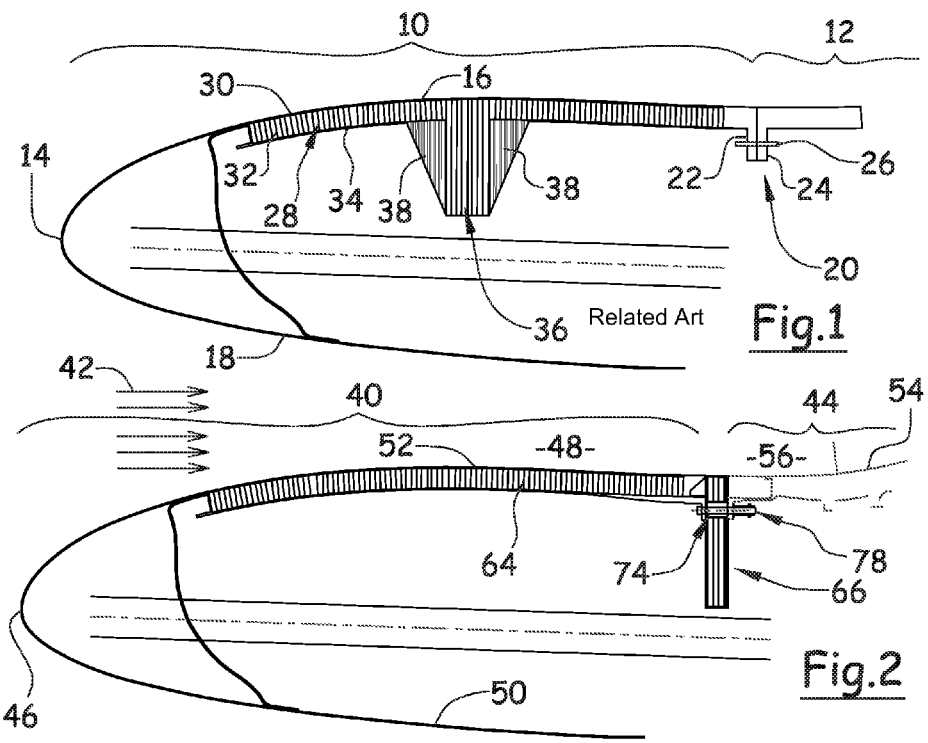
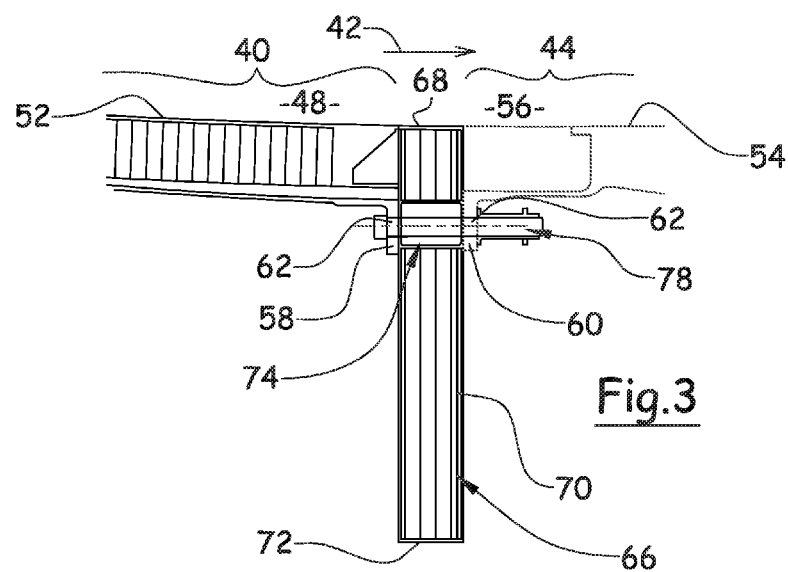

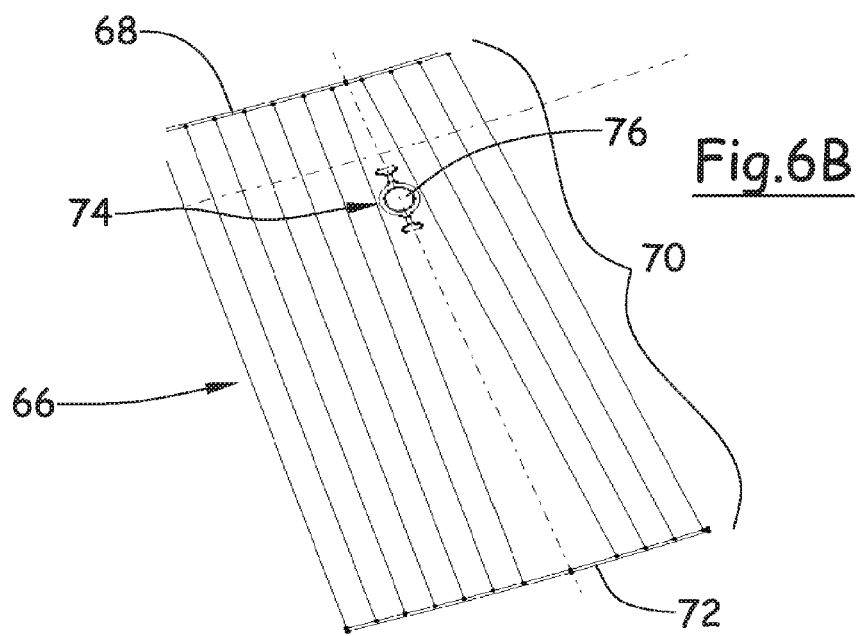
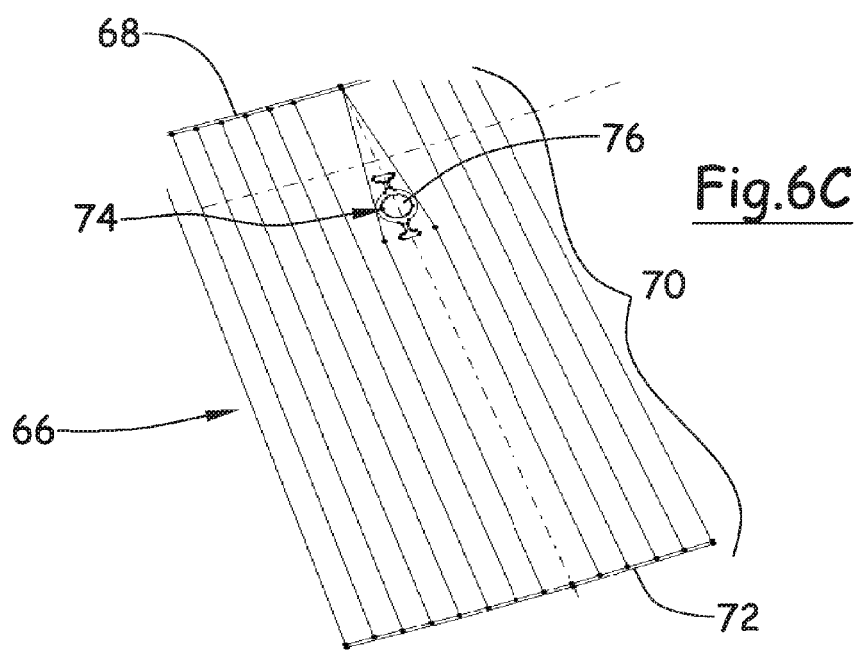

US 8,684,301 B2

WAVE ATTENUATION PANEL INSERTED BETWEEN THE MOTOR AND AIR INLET OF AN AIRCRAFT NACELLE

BACKGROUND OF THE INVENTION

1. Field of the Invention

This invention relates to a wave attenuation panel that is inserted between a power plant and an air intake of an aircraft nacelle.

An aircraft propulsion system comprises a nacelle in which a power plant that is connected by means of a mast to the rest of the aircraft is arranged in an essentially concentric manner.

2. Description of the Related Art

As illustrated in FIG. 1, the nacelle comprises an air intake 10 at the front, and said air intake makes it possible to channel an air flow into a power plant 12, whereby a first portion of the entering air flow, called primary flow, passes through the power plant to participate in the combustion, and whereby the second portion of the air flow, called secondary flow, is entrained by a fan and flows into an annular pipe that is delimited by the inside wall of the nacelle and the outside wall of the power plant.

The air intake 12 comprises a lip 14 whose surface that is in contact with the aerodynamic flows is extended inside the nacelle via an inside pipe 16 with essentially circular cross-sections and outside the nacelle via an outside wall 18 with essentially circular cross-sections.

The air intake 12 is connected to the power plant by flange-type connecting means 20 comprising, on the one hand, at the end of the inside pipe 16, an annular collar 22 that offers a first support surface and, on the other hand, at the power plant, an annular collar 24 that offers a second support surface that can rest against the first, bolts 26, rivets or the like being distributed over the circumference of the collars 22 and 24 to keep them flattened against one another and thus to ensure the connection between the air intake and the power plant.

Techniques that have been developed to reduce the noise emitted by an aircraft, and in particular the noise emitted by the propulsion systems, consist in placing a coating 28 whose purpose is to absorb a portion of the sound energy, in particular by using the principle of the Helmholtz resonators, at the level of, in particular, the wall of the inside pipe 16. So as to optimize the acoustic treatment, this coating 28 is to extend over the largest surface and generally extends from the collar 22 up to the lip 14.

In a known manner, a coating for the acoustic treatment 28, also called an acoustic attenuation panel, comprises—from the outside to the inside—an acoustically resistive porous layer 30, at least one alveolar structure 32, and a reflective or impermeable layer 34.

The acoustically resistive layer is a porous structure that has a dissipative role, partially transforming into heat the acoustic energy of the sound wave that passes through said layer. It comprises so-called open zones that can allow acoustic waves and other so-called closed or solid waves to pass, not allowing the sound waves to pass but designed to ensure the mechanical strength of said layer. This acoustically resistive layer is characterized in particular by an open surface area ratio that varies essentially as a function of the engine, components that constitute said layer.

According to another constraint, in certain cases of flight, the air flow that enters the nacelle and that has to supply the power plant exhibits a high distortion of pressure and speed that can generate a pumping effect in the power plant. The blades of the power plant are then driven by an oscillating movement along the longitudinal axis of the nacelle that generates a wave that propagates in the inside pipe 16, increasing in intensity until one or more blades breaks.

A first solution to remedy this problem consists in increasing the mechanical strength of the blades so as to limit this oscillating movement. However, this solution is not satisfactory because it leads to increasing the weight of the blades and therefore the on-board weight.

Another solution consists in providing a wave attenuation panel 36 that comprises, like the acoustic attenuation panel from the outside to the inside, a layer that is permeable to certain waves, at least one alveolar structure, and a reflective or impermeable layer. Thus, this panel is intended to absorb in its passage the wave(s) produced by the pumping effect of the power plant and to limit its propagation. According to one embodiment, this panel 36 extends over the circumference of the inside pipe 16, in place of a portion of the acoustic attenuation panel 28.

The characteristics of this wave attenuation panel are determined based on the wave that is to be attenuated.

For this purpose, this wave attenuation panel 36 has a thickness (in the radial direction) that is larger than that of an acoustic attenuation panel 28, on the order of three times greater, and it has a width (in the longitudinal direction) that varies based on the position of said panel in the inside pipe 16. Thus, the closer the wave atteuation panel 36 is to the lip 14, the larger its width, and conversely, the closer it is to the power plant, the smaller its width.

Consequently, there is a tendency to place this wave attenuation panel 36 close to the power plant so as to reduce its dimensions and therefore its weight.

Even if it limits the risks of the blades breaking, the presence of this wave attenuation panel 36 is not without impact.

Thus, this presence tends to reduce the surface area of the coating 28 for the acoustic treatment and therefore to reduce the performance levels of said treatment.

In addition, it is necessary to provide reinforcements 38 on either side of the panel 36 over its entire circumference so as to hold it, which contributes to increasing the on-board weight.

SUMMARY OF THE INVENTION

Also, the purpose of this invention is to eliminate the drawbacks of the prior art by proposing a nacelle that incorporates a wave attenuation panel that limits the on-board weight and that does not alter the performance levels of the acoustic treatment.

For this purpose, the invention has as its object an aircraft nacelle that comprises an air intake that makes it possible to channel an air flow in the direction of a power plant, whereby said air intake comprises an inside pipe that forms an aerodynamic surface that is in contact with the air flow that is extended toward the rear by an aerodynamic surface of a pipe of the power plant, whereby said nacelle comprises a wave attenuation panel whose purpose is to limit or prevent the propagation of at least one wave that is produced during the pumping of the power plant and comprises a layer that is in contact with the air flow that can allow to pass said at least one wave, the propagation of which an attempt is made to limit or prevent, at least one alveolar structure, and a reflective or impermeable layer, characterized in that said wave attenuation panel is inserted between the air intake and the power plant, and its layer that is in contact with the air flow ensures the continuity of the aerodynamic surfaces that are arranged downstream and upstream and in that said wave attenuation panel comprises inserts that can be inserted between the air intake and the power plant so as not to crush said wave attenuation panel.

BRIEF DESCRIPTION OF THE DRAWING FIGURES

Figure 5A:
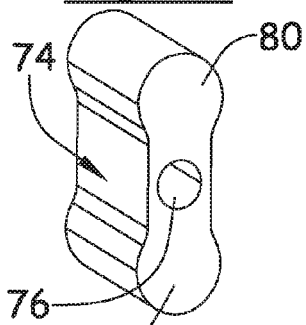
Figure 5B:
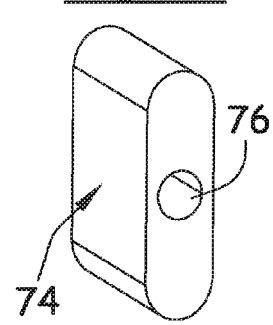
Figure 5C:
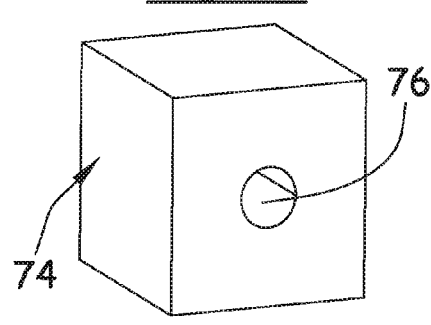
Figure 6A:
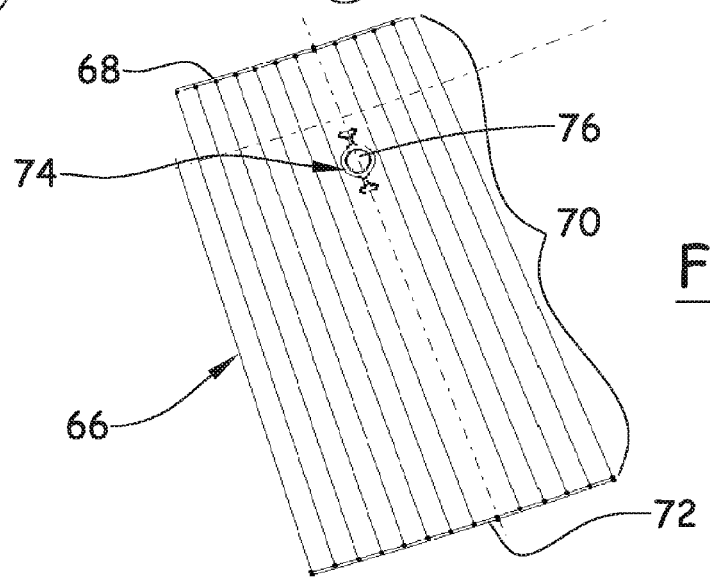

Other characteristics and advantages will emerge from the following description of the invention, a description that is provided only by way of example, relative to the accompanying drawings, in which:

FIG. 1 is a cutaway along a radial plane of a portion of the front of an aircraft nacelle according to the prior art, FIG. 2 is a cutaway along a radial plane of a portion of the front of an aircraft nacelle according to the invention, FIG. 3 is a cutaway along a radial plane that affords a detailed illustration of a wave attenuation panel that is inserted between an air intake and a power plant of an aircraft nacelle, FIG. 4 is a perspective view of an insert of a wave attenuation panel and connecting means, FIGS. 5A to 5C are perspective views that illustrate different variants of an insert of a wave atteuation panel according to the invention, and FIGS. 6A to 6C are cutaways along a transverse plane that illustrates different variants of a wave attenuation panel according to the invention.

DETAILED DESCRIPTION OF THE INVENTION

FIG. 1 shows a portion of the front of a nacelle of an aircraft that at 40 comprises an air intake that makes it possible to channel an air flow 42 in the direction of a power plant 44.

Hereinafter, longitudinal direction is defined as a direction that is parallel to the longitudinal axis of the power plant, and radial direction is defined as a direction that is perpendicular to the longitudinal axis. Transverse plane is defined as a plane that is perpendicular to the longitudinal direction, and radial plane is defined as a plane that contains the longitudinal axis that is perpendicular to a transverse plane.

The air intake 40 comprises a lip 46 whose surface that is in contact with the incoming air flow 42 is extended inside the nacelle via an inside pipe 48 with essentially circular cross-sections and outside of the nacelle via an outside wall 50 with essentially circular cross-sections.

The inside pipe 48 comprises an aerodynamic surface 52 that is in contact with the air flow 42 that extends toward the rear of the nacelle by an aerodynamic surface 54 of a pipe 56 of the power plant.

At the rear, the inside pipe 48 of the air intake comprises a ring-shaped edge opposite a ring-shaped edge of the pipe 56 of the power plant.

According to an embodiment that affords a detailed illustration in FIG. 3, the inside pipe 48 comprises an annular collar 58 that comprises a first support surface that forms the rear edge of said inside pipe 48. Opposite, the pipe 56 of the power plant comprises an annular collar 60 that comprises a second support surface that forms the front edge of said pipe 56 that is essentially parallel to the first support surface.

The collars 58 and 60 comprise openings 62 that can make possible the passage of rods, arranged opposite, spaced and distributed over the circumference of the collars.

Advantageously, the inside pipe 48 comprises a coating for the acoustic treatment 64, also called an acoustic attenuation panel, comprising—from the outside to the inside—an acoustically resistive porous layer, at least one alveolar structure, and a reflective or impermeable layer, whereby the acoustically resistive layer forms the aerodynamic surface 52.

The power plant, the air intake, as well as the acoustic attenuation panel are not presented in more detail because they are known to one skilled in the art.

According to the invention, the nacelle comprises a wave attenuation panel 66 whose purpose is to limit or prevent the propagation of at least one wave that is produced during the pumping of the power plant that can damage the blades of the fan of the power plant.

This wave attenuation panel 66 comprises a layer 68 that is in contact with the air flow 42 that can allow to pass said at least one wave, the propagation of which an attempt is made to limit or prevent, at least one alveolar structure 70, and a reflective or impermeable layer 72. It would be possible to consider several stacked alveolar structures, separated by a layer that can allow waves to pass.

This wave attenuation panel 66 extends over at least one portion of the circumference of the nacelle and preferably over the entire circumference. It can be made of one or more parts.

The characteristics of the layer 68, in particular the open surface area ratio, and the alveolar structure(s) are adjusted based on the wave(s), the propagation of which an attempt is made to limit or prevent. According to one embodiment, the wave attenuation panel 66 has a thickness that is at least equal to three times that of the acoustic panel 64 of the air intake.

According to an important characteristic of the invention, the wave attenuation panel 66 is inserted between the air intake and the power plant, and its layer 68 forms an aerodynamic surface that can ensure the continuity of the aerodynamic surfaces 52 and 54 that are arranged downstream and upstream in the direction of flow of the air flow 42. In addition, it comprises inserts 74, also called crosspieces, able to be inserted between the air intake and the power plant so as to take up in particular the compressive forces between the air intake and the power plant so as not to crush said wave attenuation panel 66.

This arrangement makes it possible to reduce the width of the wave attenuation panel to the extent that it is placed as close as possible to the power plant. In addition, taking into account its position, it does not interfere with the acoustic attenuation treatment and does not reduce the performance levels of said treatment. Finally, the inserts 74 ensure the passage of the flows of forces between the air intake and the power plant.

The inserts 74 are arranged in openings that pass through the wave attenuation panel whose shapes are adjusted to those of the inserts 74 to immobilize said inserts relative to the panel 66.

Advantageously, the inserts 74 comprise a through hole 76 that makes possible the passage of connecting means 78 in the form of a rod that can ensure the connection between the air intake and the power plant.

This arrangement makes it possible to obtain a simple and effective hold of the wave attenuation panel by limiting the additional on-board weight, the means 78 ensuring the connection between the air intake and the power plant but also between the wave attenuation panel and the rest of the nacelle.

According to the variants, the connecting means 78 come in the form of bolts, rivets or the like comprising a rod with two stops on either side that can flatten the air intake and the power plant toward one another and hold the wave attenuation panel 66.

The inserts 74 are spaced and preferably distributed over the circumference of the nacelle and arranged to the right of the openings 62.

According to another characteristic, the shapes of the inserts 74 are determined so as to increase the moment of inertia of said inserts in a radial plane. This type of profile makes it possible to take up the possible moments and to limit the impact of inserts on the treatment of waves, the largest dimension being used in a radial direction so that the inserts interfere with a limited number of cells of the alveolar structure 70.

According to the variants, the insert 74 can have a constant cross-section in the longitudinal direction and a prismatic cross-section (square or rectangular) as illustrated in FIG. 5C, an oblong cross-section, as illustrated in FIG. 5B, with the largest dimension oriented in a radial direction, or an elongated cross-section with two lobes 80 that are arranged symmetrically relative to the hole 76 in the radial direction as illustrated in FIG. 5A.

According to another embodiment that is illustrated in FIG. 4, the insert 74 comprises a cross-section with a central portion in the form of a cylinder with a cylindrical bore 76 as well as two T shapes arranged symmetrically, the foot of the T being connected to the central part.

The shape of the insert is determined based on the structural constraints.

According to a first variant, the cells of the alveolar structure 70 are delimited by walls that are essentially parallel to one another, as illustrated in FIG. 6A.

As a variant, the shapes of the cells of the alveolar structure 70 can be adjusted so as to reduce the impact of inserts on the treatment of waves.

According to the variants that are illustrated in FIGS. 6B and 6C, the walls of the cells of the alveolar structure interfering with the inserts have tapered shapes so as to reduce the size of the cross-section of cells that interfere with the insert at the layer 68.

According to one embodiment that is illustrated in FIG. 6B, the variation of the cross-section of the cell that interferes with an insert 74 is gradual from the permeable layer with waves 68 up to the impermeable layer 72.

According to another embodiment that is illustrated in FIG. 6C, the cell that interferes with an insert can have a cross-section that varies over a certain thickness from a reduced or zero cross-section at the wave-permeable layer 68 up to a cross-section that makes it possible to house the insert and to preserve this constant cross-section up to the impermeable layer 72.

The invention claimed is:

1. An aircraft nacelle, that comprises:
an air intake (40) configured to channel an air flow (42) in a direction of a power plant (44), said air intake (40) comprising an inside pipe (48) that forms an aerodynamic surface (52) configured to be in contact with the air flow (42) that extends toward a rear of the nacelle by an aerodynamic surface (54) of a pipe (56) of the power plant;
a wave attenuation panel (66) configured to limit or prevent propagation of at least one wave produced during pumping of the power plant, the wave attenuation panel extending over at least one portion of a circumference of the nacelle, the wave attenuation panel comprising:
a layer (68) configured to be in contact with the air flow (42) and to pass said at least one wave,
at least one alveolar structure (70), and
a reflective or impermeable layer (72),
said wave attenuation panel (66) being inserted between the air intake (40) and the power plant (44), and said layer (68) that is in contact with the air flow (42) ensuring continuity of the aerodynamic surfaces (52, 54) that are arranged downstream and upstream,
wherein said wave attenuation panel comprises inserts (74) that are inserted between an annular collar (58) forming the rear edge of said air intake (40) and an annular collar (60) forming the front edge of the power plant so as to take up compressive forces between the air intake and the power plant so as not to crush said wave attenuation panel (66), and
wherein the inserts (74) comprise a through hole (76) that allows the passage of connecting means (78) that can ensure the connection between the air intake and the power plant, said hole being directed along a longitudinal axis.

2. The aircraft nacelle according to claim 1, wherein the inserts (74) are arranged in openings that pass through the wave attenuation panel of which the shapes are adjusted to those of the inserts (74) to immobilize said inserts relative to the wave attenuation panel (66).

3. The aircraft nacelle according to claim 1, wherein the inserts (74) have a shape configured to increase a moment of inertia of said inserts along a radial plane by interlocking with surrounding structure.

4. The aircraft nacelle according to claim 3, wherein the inserts (74) have a constant oblong cross-section with two lobes (80) that are arranged symmetrically.

5. The aircraft nacelle according to claim 3, wherein the inserts (74) have a constant cross-section with a central part in the form of a cylinder with a cylindrical hole (76) as well as two T shapes that are arranged symmetrically, the foot of the T being connected to the central part.

6. The aircraft nacelle according to claim 1, wherein the walls of the cells of the alveolar structure that interfere with the inserts (74) have tapered shapes so as to reduce the size of a cross-section of said cells at the layer (68) that is in contact with the air flow.

7. The aircraft nacelle according to claim 6, wherein a variation of the cross-section of the cell that interferes with an insert (74) is gradual from the layer (68) that is in contact with the air flow (42) up to the impermeable layer (72).

8. The aircraft nacelle according to claim 6, wherein the cells that interfere with an insert have a cross-section that varies over a certain thickness from a reduced or zero cross-section at the layer (68) that is in contact with the air flow (42) up to a cross-section that makes it possible to house the insert, and said cells preserve this constant cross-section up to the impermeable layer (72).

9. The aircraft nacelle according to claim 1, wherein the inserts (74) are arranged in openings that pass through the wave attenuation panel of which the shapes are adjusted to those of the inserts (74) to immobilize said inserts relative to the wave attenuation panel (66).

10. The aircraft nacelle according to claim 1, wherein the walls of the cells of the alveolar structure that interfere with the inserts (74) have tapered shapes so as to reduce the size of the cross-section of said cells at the layer (68) that is in contact with the air flow.

11. The aircraft nacelle according to claim 1, wherein the wave attenuation panel extends over an entirety of the circumference of the nacelle.

12. The aircraft nacelle according to claim 1, wherein the wave attenuation panel has a thickness that is at least equal to three times a thickness of an acoustic panel of the air intake.

13. An aircraft nacelle, that comprises:
an air intake configured to channel an air flow in a direction of a power plant;

an inside pipe that forms the air intake, the inside pipe having an aerodynamic surface configured to be in contact with the air flow;

a pipe of the power plant, the pipe of the power plant having an aerodynamic surface;

a wave attenuation panel located between the inside pipe and the pipe of the power plant, the wave attenuation panel extending over at least one portion of a circumference of the nacelle, the wave attenuation panel including a layer configured to be in contact with the air flow and to pass at least one wave, the layer ensuring continuity of the aerodynamic surfaces, wherein said wave attenuation panel comprises inserts (74) that are inserted between an annular collar (58) forming the rear edge of said air intake (40) and an annular collar (60) forming the front edge of the power plant so as to take up compressive forces between the air intake and the power plant so as not to crush said wave attenuation panel (66), and wherein the inserts (74) comprise a through hole (76) that allows the passage of connecting means (78) that can ensure the connection between the air intake and the power plant, said hole being directed along a longitudinal axis.

14. The aircraft nacelle according to claim 13, wherein the wave attenuation panel further comprises at least one alveolar structure, and a reflective or impermeable layer.

15. The aircraft nacelle according to claim 13, wherein the wave attenuation panel extends over an entirety of the circumference of the nacelle.

16. The aircraft nacelle according to claim 13, wherein the wave attenuation panel has a thickness that is at least equal to three times a thickness of an acoustic panel of the air intake.

17. The aircraft nacelle according to claim 13, wherein the inserts are arranged in openings that pass through the wave attenuation panel of which the shapes are adjusted to those of the inserts to immobilize said inserts relative to the wave attenuation panel.

18. The aircraft nacelle according to claim 13, wherein the inserts have a shape configured to increase a moment of inertia of said inserts along a radial plane by interlocking with surrounding structure.

* * * * *

UNITED STATES PATENT AND TRADEMARK OFFICE
CERTIFICATE OF CORRECTION

PATENT NO. : 8,684,301 B2
APPLICATION NO. : 12/990562
DATED : April 1, 2014
INVENTOR(S) : Porte et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 547 days.

Signed and Sealed this
Twenty-ninth Day of September, 2015

Michelle K. Lee
*Director of the United States Patent and Trademark Office*